US008609969B2

(12) United States Patent
Bao et al.

(10) Patent No.: US 8,609,969 B2
(45) Date of Patent: Dec. 17, 2013

(54) AUTOMATICALLY ACQUIRING FEATURE SEGMENTS IN A MUSIC FILE

(75) Inventors: Shenghua Bao, Beijing (CN); Jian Chen, Beijing (CN); Zhong Su, Beijing (CN); Xin Ying Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 13/278,406

(22) Filed: Oct. 21, 2011

(65) Prior Publication Data

US 2012/0167748 A1 Jul. 5, 2012

(30) Foreign Application Priority Data

Dec. 30, 2010 (CN) .......................... 2010 1 0624747

(51) Int. Cl.
*A63H 5/00* (2006.01)
*G04B 13/00* (2006.01)

(52) U.S. Cl.
USPC .................. 84/609; 84/615; 84/619; 84/649; 84/653; 84/657

(58) Field of Classification Search
None
See application file for complete search history.

(56) References Cited

U.S. PATENT DOCUMENTS

| 7,099,558 | B2 * | 8/2006 | Yokota et al. ................. 386/290 |
| 7,155,108 | B2 * | 12/2006 | Yokota et al. ................. 386/279 |
| 7,230,177 | B2 * | 6/2007 | Kawashima .................... 84/610 |
| 7,488,886 | B2 * | 2/2009 | Kemp ............................. 84/609 |
| 7,600,085 | B2 * | 10/2009 | Yokota et al. ................. 711/159 |
| 8,139,918 | B2 * | 3/2012 | Yokota et al. ................. 386/248 |
| 8,275,614 | B2 * | 9/2012 | Miyamoto et al. ............ 704/235 |
| 2003/0023421 | A1 * | 1/2003 | Finn et al. ......................... 704/1 |
| 2004/0099126 | A1 * | 5/2004 | Kawashima .................... 84/609 |
| 2005/0016360 | A1 | 1/2005 | Zhang |
| 2006/0288849 | A1 | 12/2006 | Peeters |
| 2007/0009225 | A1 * | 1/2007 | Yokota et al. ................... 386/52 |
| 2007/0131094 | A1 * | 6/2007 | Kemp ............................. 84/609 |
| 2008/0156178 | A1 * | 7/2008 | Georges et al. ................ 84/645 |
| 2008/0209484 | A1 | 8/2008 | Xu |
| 2008/0236371 | A1 | 10/2008 | Eronen |
| 2008/0303823 | A1 * | 12/2008 | Yanagawa ..................... 345/467 |
| 2010/0031804 | A1 * | 2/2010 | Chevreau et al. .............. 84/609 |
| 2010/0082346 | A1 * | 4/2010 | Rogers et al. ................. 704/260 |
| 2011/0071827 | A1 * | 3/2011 | Lee et al. ...................... 704/235 |
| 2012/0167748 | A1 * | 7/2012 | Bao et al. ........................ 84/609 |

OTHER PUBLICATIONS

IBM, "Search/Recognition Algorithm for Sound Files," IP.com; Prior Art Database; Technical Disclosure—IPCOM000100062D; pp. 1-4; Mar. 2005.
Jouni Paulus and Anssi Klapuri, "Music Structure Analysis Using a Probabilistic Fitness Measure and an Integrated Musicological Model," Proc. 9th Conference Music Inf. Retrieval (ISMIR), Session 3b, Computational Musicology; pp. 369-374; 2008.
Yu Shiu et al., "Similar Segment Detection for Music Structure Analysis Via Viterbi Algorithm," IEEE International Conference on Mulitmedia and Expo; 2006.

* cited by examiner

*Primary Examiner* — Marlon Fletcher
(74) *Attorney, Agent, or Firm* — Cantor Colburn LLP; Gail Zarick

(57) ABSTRACT

A method of automatically acquiring a feature segment in a music file includes receiving, with a processing device, a music file; converting the music file into a character string; evaluating at least one character string segment in the character string based on one or more music features; and determining, based on an evaluation result, at least one music segment corresponding to at least one character string segment in the character string as a feature segment.

20 Claims, 5 Drawing Sheets

AUTOMATICALLY ACQUIRING FEATURE SEGMENTS IN A MUSIC FILE

PRIORITY

This application claims priority to Chinese Patent Application No. 201010624747.6, filed 30 Dec. 2010, and all the benefits accruing therefrom under 35 U.S.C. §119, the contents of which in its entirety are herein incorporated by reference.

BACKGROUND

The present invention generally relates to a method and a system of processing a music file, and more particularly, to a method and a system of automatically acquiring feature segments in a music file.

Word input is a mainly-used traditional song search approach. For example, a user can acquire a returned song result through inputting information such as song title, composition, lyrics, etc. In recent years, Query by Humming (QbH), which breaks through the traditional word search approach, provides a new sound search approach. In this approach, the user hums a segment of song or melody as a system input, and then a humming search system will acquire a returned song or music result through retrieving a database. One QbH product is Musipedia, which uses humming or keystroke as user input. Also, Midomi is a kind of QbH web service, which currently mainly provides humming search services in English, Japanese, Chinese and Spanish. Additionally, Tunebot is a QbH product with humming, tune, melody etc. as user input. QbH search is also listed in MPEG-7 standards. Therefore, how to perform a quick and effective search in mass music files is an objective constantly pursued in the development of humming search technology.

SUMMARY

In one embodiment, a method of automatically acquiring a feature segment in a music file includes receiving, with a processing device, a music file; converting the music file into a character string; evaluating at least one character string segment in the character string based on one or more music features; and determining, based on an evaluation result, at least one music segment corresponding to at least one character string segment in the character string as a feature segment.

In another embodiment, a system for automatically acquiring a feature segment in a music file includes receiving means, configured to receive a music file; converting means, configured to convert the music file into a character string; evaluating means, configured to evaluate at least one character string segment in the character string based on one or more music features; and determining means, configured to determine, based on an evaluation result, at least one music segment corresponding to at least one character string segment in the character string as a feature segment.

BRIEF DESCRIPTION OF THE SEVERAL VIEWS OF THE DRAWINGS

Referring to the exemplary drawings wherein like elements are numbered alike in the several Figures.

DETAILED DESCRIPTION

Figure 1:
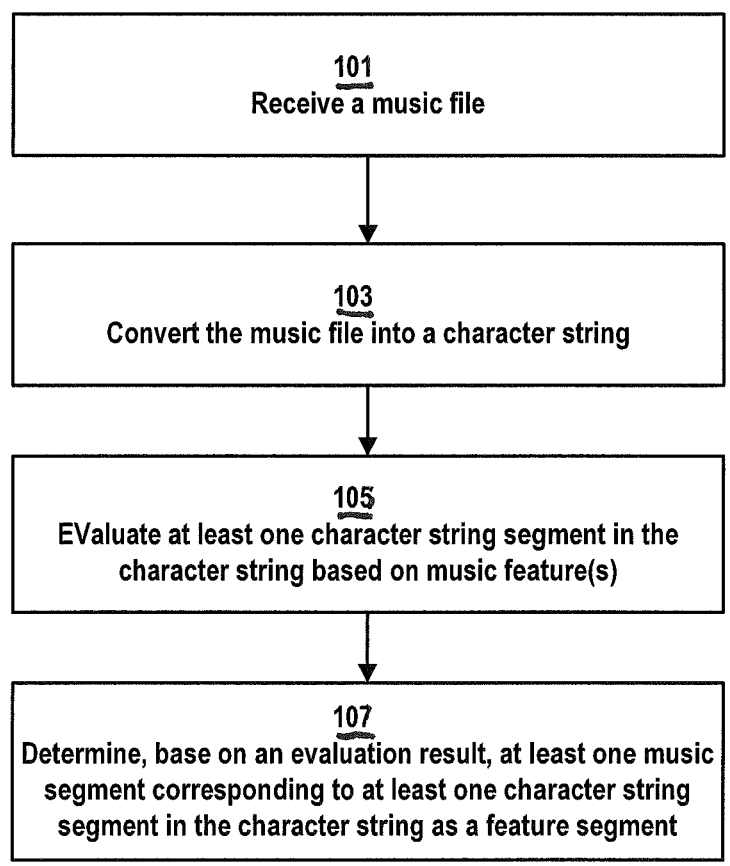
FIG. 1 illustrates a flow chart of a method of automatically acquiring a feature segment in a music file.

It has been found that querying speed may be improved by decreasing data amount of music files being searched for in a humming search. Generally, each music file has its own most representative segments (for example, the refrain part of a song) that are more easily to be learned by heart. Thus, in a humming search, these segments are prone to be hummed by a user as a query for the search. Therefore, how to find a representative segment (feature segment) in a music file is a problem to be solved. Labor costs may be greatly saved if a feature segment in a music file can be automatically determined, which thereby ensures a better operability of performing humming search by searching a feature segment.

Most representative segments in a music file may be automatically acquired using the technology of automatically acquiring a feature segment in a music file according to embodiments described herein. Searching these most representative segments may greatly decrease the time for searching while guaranteeing the searching effect, and meanwhile it reduces the storage load for to-be-searched data, thereby saving storage space. In particular, storage capacity of some mobile terminals is limited. Hence, if it is possible to merely store a feature segment of a music file, quick humming search would be enabled locally.

In addition to humming search, the technology of automatically acquiring a feature segment in a music file has many other applications. For example, extraction of a mobile phone color ring can be automatically performed. It is known that a mobile phone color ring is limited in time length, thus great labor cost may be saved by automatically extracting a feature segment in a music file as the mobile phone color ring.

For another example, the technology of the present disclosure may also be used to implement preview of a music file, such that the viewer may quickly determine whether a music file is the one wanted. In particular, copyright laws in many countries and regions regard it as an infringing act to provide a duplicated copy of a music file on the Internet without consent of the rights holder, but it might be regarded as reasonable use in some countries and regions to provide merely a feature segment of a small segment of music file as a snippet available for web users to preview during the process of online song search.

Several possible application scenarios of the present invention have been simply enumerated above. However, the present embodiments are not limited to any of the above application scenarios, but are applicable to any application that needs automatically acquiring a feature segment in a music file.

Hereinafter, a great number of specific details are provided to help thoroughly understand the present invention. However, it is apparent to whom skilled in the art that even without these specific details, the understanding on this invention will not be affected. Further, it should be understood that use of any of the following specific terms is only for the convenience of depiction, and thus the present invention should not be limited to any particular application expressed and/or implied by these terms.

FIG. 1 illustrates a flow chart of a method of automatically acquiring a feature segment in a music file. At step 101, a music file is received. The music file may comprise either a song sung by a singer or a melody played by a musical instrument. The music file may be stored in various file formats (for example, WAV, MP3, WMA, etc.).

At block 103, the music file is converted into a character string. The prior art has disclosed some methods of converting a music file into a character string, for example, the software product IntelliScore Ensemble (http://3d2f.com/programs/14-967-intelliscore-ensemble-mp3-to-midi-converter-download.shtml) may convert music files in various formats into MIDI music. The MISI music is further symbolized to be converted into a true character string. Many software products can be used to convert MIDI music into a character string, for example MIDIFile2Text1.1 (http://www.softpedia.com/downloadTag/MIDI+to +Text). The character string may be either a simple musical notation for a music file (for example, 35 32|32 3| . . . ) or a further processing result to the simple musical notation, for example, further performing standard representation on any arbitrary one of tone or syllable length in the simple musical notation of the music file. To further perform standard representation on a pitch may involve performing uniform digital representation on rise and fall of a tone, for example 2→9. To perform standard representation on a syllable length may involve performing uniform digital representation on the syllable length, for example, 3•→333. Besides, other standard representation of the simple musical notation may be performed such that it is further digitalized, for example, 910 23|333 5→9, 10 2, 3, 3, 3, 3, 5. What have been enumerated above are several instances for further processing a simple musical notation of a music file; these further processing schemes may further improve the accuracy of determining a feature segment. However, these instances do not constitute a limitation to the present invention. In practice, the above further processing on a simple musical notation may not be performed as practically required and out of the consideration of computing cost. For example, "3•" may only be simply expressed as "3" without considering the issue of syllable length.

At block 105, at least one character string segment in the character string is evaluated based on a music feature. The music feature may be repetition times of a music segment, average pitch, segment location, segment length, semitone percentage or one or a combination of more of other music features. Specific content of evaluating at least one character string segment in the character string will be described below in more detail.

At block 107, based on an evaluation result, at least one music segment corresponding to at least one character string segment in the character string is determined as a feature segment.

Figure 2:
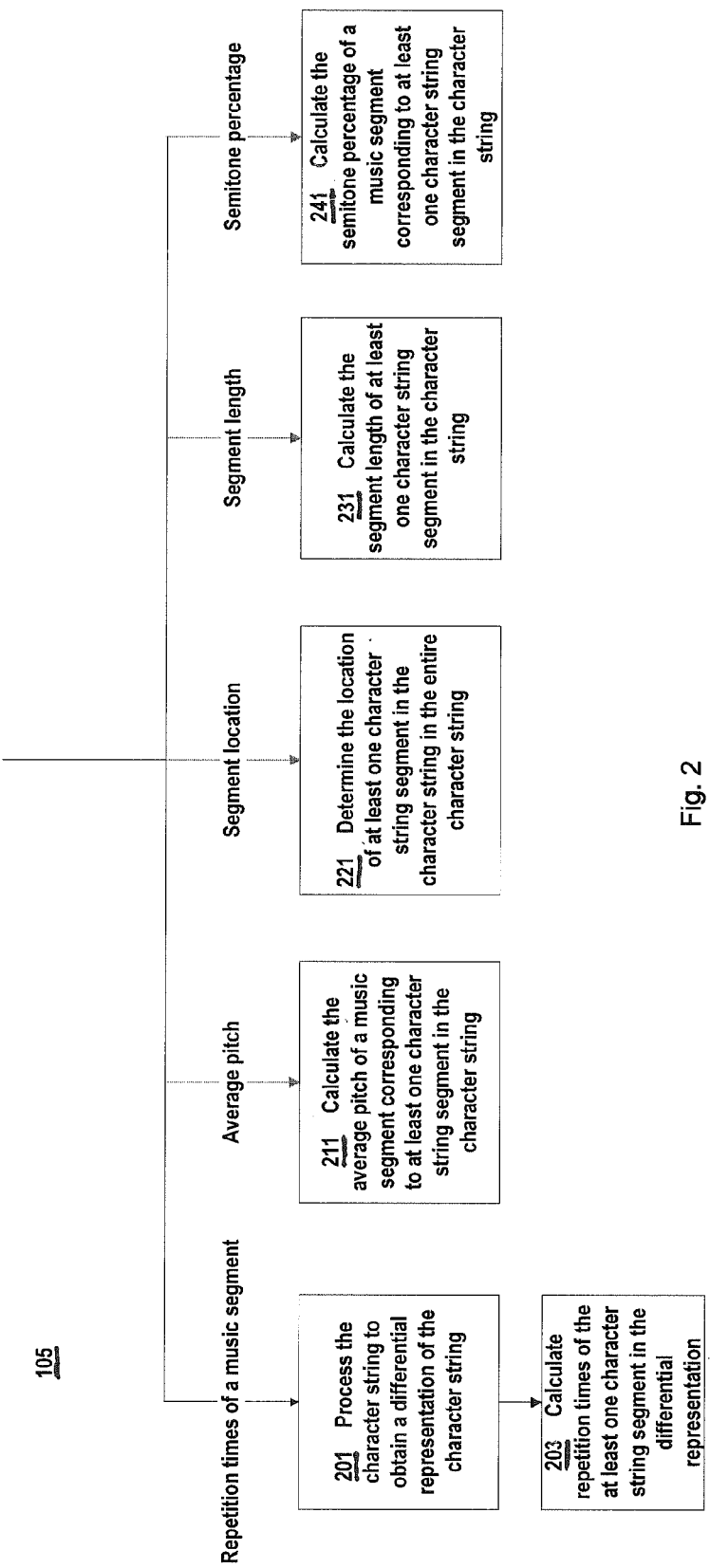
FIG. 2 illustrates a flow chart of evaluating at least one character string segment in a character string based on a music feature according to one embodiment.

FIG. 2 illustrates a flow chart of evaluating at least one character string segment in a character string based on a music feature according to one embodiment. Blocks 201 and 203 describe further implementation details of evaluating if the music feature is a repetition of a music segment. Block 211 describes further implementation details of evaluating if the music feature is average pitch. Block 213 describes further implementation details of evaluating if the music feature is segment location. Block 215 describes further implementation details of evaluating if the music feature is segment length. Block 217 describes further implementation details of evaluating if the music feature is semitone percentage.

According to one embodiment, if the music feature is repetition times of a music segment, in evaluating the repetitive music segment, for example, the refrain of the song is determined, the repetitive times of the character string segment is calculated, and the acquired calculation result is the value of this music feature (i.e., repetitive times of the music segment). For example, in the song *Beijing Welcomes You*, two repetitive character string segments exist, which are character string segments A "35323233 . . . 2033" and B "35856 . . . 2811", respectively, with the entire melody arrangement being AABAABBBBB. Therefore, the repetitive times for segment A is 4, and the repetitive times for segment B is 6.

According to another embodiment, not only may a simple repetition of a music segment be calculated, but also the tone modification of the music segment can be calculated (for example, rising tone repetition or falling tone repetition). For example, in the song *Edelweiss*, there is a rising tone repetition from the character string segment "345666" to the character string segment "567888." Such similar tone modification repetition phenomenon is quite common in many songs, thus making statistics on tone modification repetition suitable for determining representative segments in a music file more comprehensively and accurately. In order to generate statistics on tone modification repetition, at block 201, the character string is processed to acquire a differential representation of the character string. For example, to process the character string segment "345666" in *Edelweiss*, by deducting a preceding digit by a following digit, a character string segment after differential representation is acquired to be "11100"; likewise, to process the character string segment "567888" according to a same rule, the character string segment "11100" after differential representation may also be acquired. Performing differential representation on a character string may find segments with tone modification repetition in a music file. Of course, the present embodiments are not limited to the above enumerated differential calculation rules, but may use any differential calculation rules, for example, deducting a following digit by a preceding digit, or performing deduction every two digits, etc. After acquiring the differential representation of the character string segment, at block 203, repetition times of at least one character string segment in the differential representation is calculated. For example, the character string segment "345666" in *Edelweiss* appears once, and "567888" appears twice. By using the differential representation method in this embodiment, it may be calculated that the repetition times of the character string segment "345666" is three.

According to a further embodiment, the music feature is average pitch. At block 211, the average pitch of a music segment corresponding to at least one character string segment in the character string is calculated as the value of the music feature. For example, in the song "*Beijing Welcomes You*," the segment A is "35323233 . . . 2033," with a character string length being 52; segment B is "35856 . . . 2811," with a character string length being 43. The average pitch of segment A is (3+5+3+2+3+2+3+3+ . . . +2+0+3+3)/52=3.3, while the average pitch of segment B is (3+5+8+5+6+ . . . +2+8+1+1)/43=4.2. In many cases, a music segment with a higher average pitch is more likely to become a feature segment, for example, the average pitch in many refrains is always high. Therefore, calculating an average pitch may determine a feature segment more accurately.

According to yet a further embodiment, the music feature is segment location. At block 221, the location of at least one character string segment in the character string in the entire character string is determined. Generally, a music segment located at the end of a melody is more likely to be a feature segment than a music segment that is not located at the end. Thus, at block 221, score is further granted to the character string segment based on its location, as the value of the music feature (segment location). For example, in the song *Beijing Welcomes You*, the entire melody arrangement is AABAABBBBB, where segment B is at the end, it is scored to 1, while segment A is not at the end, it is scored to 0. Of course, the present embodiments are not limited to the above scoring approach, and other scoring approaches are also applicable. For example, a music file may be divided into head (first 20% of the entire music length), middle (middle 60% of the entire music length), and end (last 20% of the entire music length), and scores are granted based on the location of the music segment according to certain terms.

According to still a further embodiment, the music feature is segment length. At block 231, the segment length of at least one character string segment in the character string is calculated as the value of the music feature (segment length). For example, in *Beijing Welcomes You*, the character string length of segment A is 52, and the character string length of segment B is 43.

According to a further embodiment, the music feature is semitone percentage. At block 241, the semitone percentage of a music segment corresponding to at least one character string segment in the character string is calculated as the value of the music feature (semitone percentage). In some music files, the more semitones a music segment has, the more likely the music segment is a feature segment. 12345671 is an octave having 8 tones, wherein the relationships between tones are different. They are divided into whole tones and semitones, where between 3 and 4 and between 7 and 1 are semitones, and while between the other adjacent two tones are all whole tones. Therefore, two semitones exist in the character string segment "34345677" with a length of 8, which have a semitone percentage of 2/8.

Only five music features have been illustrated as examples above, however, the present embodiments are also applicable to other music features. Moreover, the present embodiments are not only suitable for one kind of music feature, but may also integrate a plurality of music features so as to perform comprehensive evaluation on at least one character string segment in the character string.

According to one embodiment, evaluating at least one character string segment in the character string at block 105 may further comprise evaluating at least one character string segment that exceeds a predetermined length in the character string. Theoretically, a character string with a length of N may be divided into character string segments with a length of n (n is greater than or equal to 1 but less than N). Actually, dividing a character string into character string segments that are too short might be meaningless for analyzing feature segments in a music file. For example, in practical operation, the embodiments is less likely to divide a character string with a length of N into N character string segments with a length of 1. Therefore, according to this embodiment, only a character string segment that exceeds a predetermined length (for example 5) in the character string is evaluated.

Figure 3:
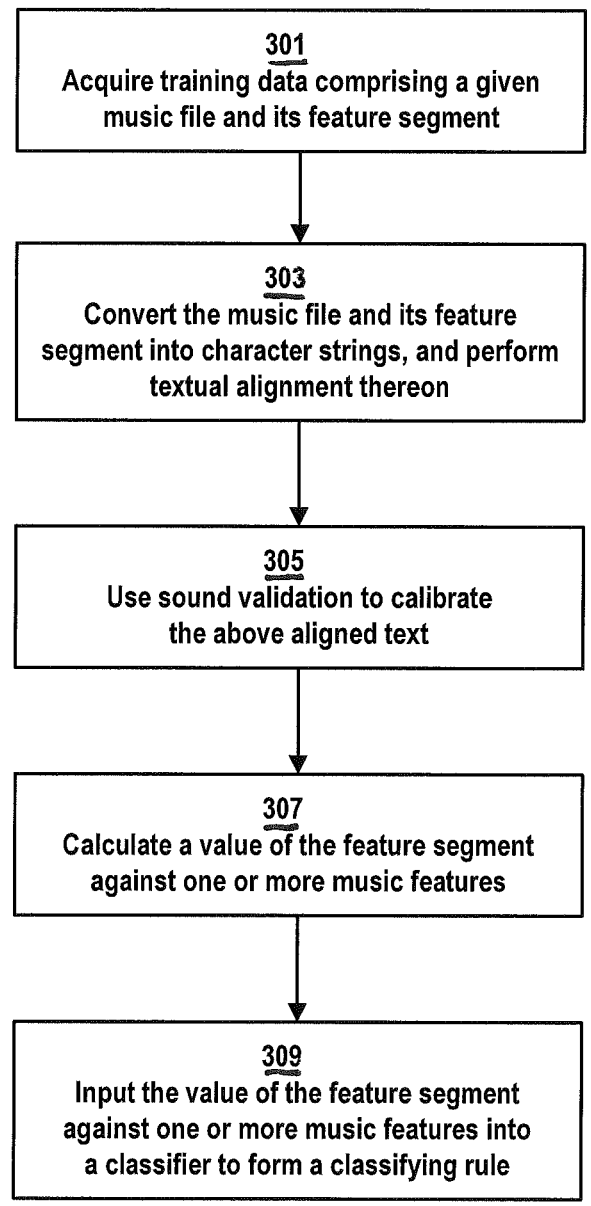
FIG. 3 illustrates a flow chart of determining, based on an evaluation result, at least one music segment corresponding to at least one character string segment in a character string as a feature segment according to one embodiment.

FIG. 3 illustrates a flow chart of determining, based on an evaluation result, at least one music segment corresponding to at least one character string segment in a character string as a feature segment according to one embodiment. At block 301, training data comprising a given music file and its feature segment are acquired. By analyzing a value of feature segment of a music file in the training data against the music feature, some classifying rules for becoming a feature segment may be determined; therefore, by applying these classifying rules to a new music file, a feature segment in the new music file can be found. In one example, the music file in training data may be some songs, and the feature segment may be a color ring of these songs, while the color ring may be a manually designated representative music segment in a song.

At block 303, the music file and its feature segment are converted into a character string, with textual alignment being performed, that is, the character string of the feature segment is positioned in the character string corresponding to the whole melody of the music file, for example, positioning "567" at the end of "1234567."

Optionally, at block 305, sound validation may be used to calibrate the above aligned text. The text alignment at block 305 may have error. There may be multiple causes for error, for example, mistakes during the process of being converted into a character string, etc. Therefore, in order to guarantee that a character string segment of a feature segment is correctly positioned in the character string of the entire song, sound validation may also be performed at block 305, for example, by determining that the sound of the feature segment corresponding to the character string "567" does appear at the end of the feature segment corresponding to the character string "12345567". Whether two sound segments are identical may be performed by comparing features of the two sound segments, such as audio frequency, pitch, intensity, etc. Some prior products or technologies, for example, product similarity, can already provide a similar sound comparison.

At block 307, the value of the feature segment against one or more music features is calculated. The music feature may be repetition times of a music segment (including simple repetition or tone modification repetition of the music segment), average pitch, segment location, segment length, semitone percentage or one or a combination of other music features.

At block 309, the value of the feature segment against one or more music features is input into a classifier to form a classifying rule. A decision tree is one of simplest classifiers in this regard. By building a decision tree through recording values of a great amount of feature segments against one or more music features, some rules for becoming a feature segment may be acquired as classifying rules, for example, the classifying rule 1 as illustrated below:

Classifying rule 1=(repetition times of music segment >5) & (average pitch >4) & (segment location >0) & (segment length >20) & (semitone percentage >=0).

The above discussed classifying rules may be used to determine whether a music segment corresponding to some character string segment is a feature segment. Still using the song *Beijing Welcomes You* as an illustrative example, where the character string of the whole melody is divided into two segments: segment A "35323233 . . . 2033," and segment B "35856 . . . 2811," with the entire melody arrangement being AABAABBBBB. Values of character string segments A and B against each music feature are illustrated in Table 1:

TABLE 1

|  | A | B |
| --- | --- | --- |
| repetition times of a music segment | 4 | 6 |
| average pitch | 3.3 | 4.2 |
| segment location | 0 | 1 |
| segment length | 43 | 52 |
| semitone percentage | 0 | 0 |

By using the acquired classifying rule 1, it may be determined that the music segment corresponding to the segment B is a feature segment of the song "Beijing Welcomes You," while the music segment corresponding to segment A is not a feature segment.

The decision tree is only a relatively simple embodiment of a classifier. Some complex classifying models can build more complex classifying rules, for example, a Naive Bayes model, and a Support Vector Machine (SVM) model, etc. The above embodiment only illustrates one embodiment of a classifying rule, which does not constitute a limitation on the present embodiments. Any classifier trained with training data may be used to determine a feature segment.

According to another embodiment, a feature segment is further determined based on a result of comparing evaluation results of different character string segments in the character string. Illustration is still made with the song *Beijing Welcomes You* as an example. By comparing comprehensive evaluation results of the values of segment A and segment B against one or more music features, it may be determined which segment is more suitable to become a feature segment. For example, weights of five music features are allocated according to Table 2 below:

TABLE 2

| Repetition times of a music segment | 40% |
|---|---|
| average pitch | 30% |
| Segment location | 10% |
| Segment length | 10% |
| semitone percentage | 10% |

In addition, normalization processing is performed to values of segment A and segment B in Table 1 against various music features, as illustrated in Table 3 below:

TABLE 3

| | A | B |
|---|---|---|
| Repetition times of a music segment | 0.67 = (4/6) | 1 |
| average pitch | 0.79 = (3.3/4.2) | 1 |
| segment location | 0 | 1 |
| segment length | 1 | 0.8 |
| semitone percentage | 0 | 0 |

Where the normalization rule is: for the repetition times of a music segment, the maximal repetition times (for example, 6 in this example) of a character string segment is 1, and the repetition times of other character string segments scale down proportionally. For example, the repetition times of segment B is 6, with a normalized value being 1, and the repetition times of segment A is 4, with the normalized value being 0.67.

For the average pitch, the maximum average pitch of a character string segment is 1, and the average pitches of other character string segments scale down proportionally. For example, the average pitch of segment B is 4. 2, with a normalized value being 1; the average pitch of segment A is 3. 3, with the normalized value being 0. 79.

For the segment location, the value at the end is 1, while the value not at the end is 0; thus, after normalization, the value of segment A is still 0, while the value of segment B is still 1.

For segment length, the normalization rule may be defined that the segment with a length between 30-50 has a normalized value of 1, the normalized value of a segment with a length of more than 50 is 0.8, and the normalized value of a segment with a length of less than 30 is 0.4. Therefore, segment A with a length of 43 has a normalized value of 1, while segment B with a length of 52 has a normalized value of 0. 8.

For a semitone percentage, the semitone percentage of a character string segment may be the value of the music feature. In this example, neither of segment A and segment B has semitone, thus their semitone percentages are both 0, and their normalized values are also 0.

The above normalization rules are only exemplary, and the present invention may also adopt other different normalization rules.

Through the above calculations, the comprehensive evaluation result of segment A is:

0.67*40%+0.79*30%+0*10%+1*10%+0*10%=0.605

The comprehensive evaluation result of segment B is:

1*40%+1*30%+1*10%+0.8*10%+0*10%=0.88

It is seen that the comprehensive evaluation result of segment B is larger than the comprehensive evaluation result of segment A, thus the music segment corresponding to segment B will be determined as the feature segment.

Because the entire melody arrangement of the song *Beijing Welcomes You* is AABAABBBBB, thus the character string segment B corresponds to 6 music segments. It is not limited by the present embodiments to select one music segment thereof as a feature segment or select a combination of a plurality of music segments as a feature segment, but a plurality of approaches may be implemented as actually required.

In the above embodiment, the character string of the song *Beijing Welcomes You* is divided into two character string segments, i.e., segment A and segment B. The present embodiments may build a more complex divide approach to the character string segments in other embodiments. For example, further dividing the character string segment A into three sub-segments A1, A2, A3; further dividing the character string segment B into three sub-segments B1, B2, B3; calculating the values of A1, A2, A3, and B1, B2, B3 against various music features, respectively, and the further comprehensively calculating the values of segment A and segment B against various music features.

Figure 4:
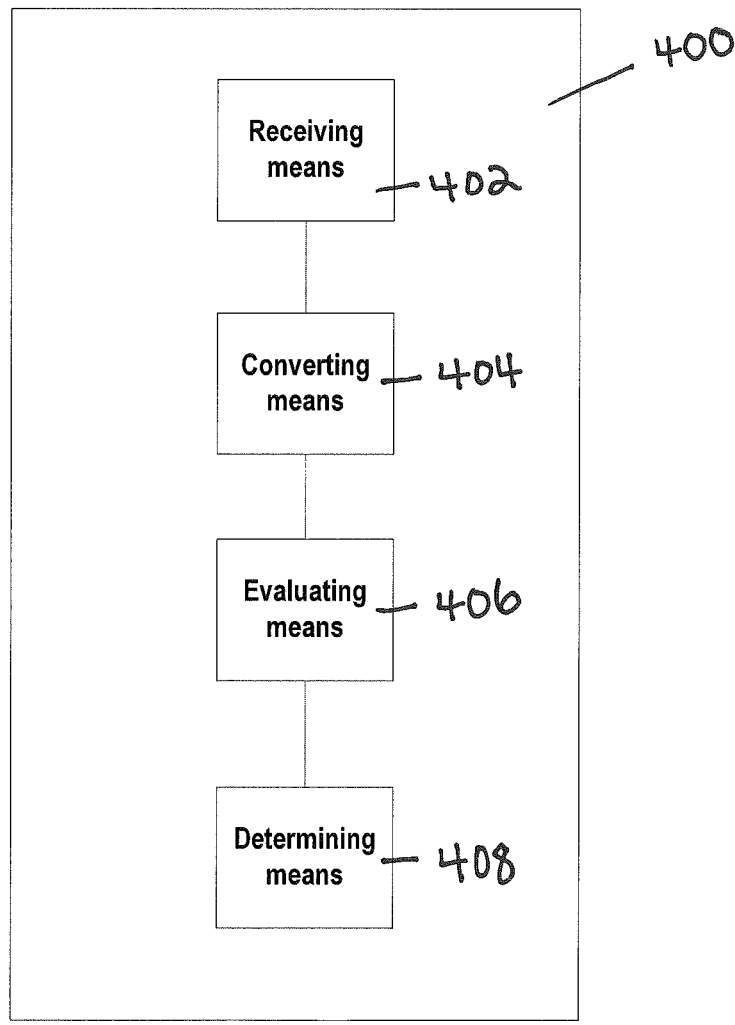
FIG. 4 illustrates a block diagram of a system of automatically acquiring a feature segment in a music file.

FIG. 4 illustrates a block diagram of a system 400 of automatically acquiring a feature segment in a music file. The system 400 of FIG. 4 comprises receiving means 402 for receiving a music file, converting means 404 for converting the music file into a character string, evaluating means 406 for evaluating at least one character string segment in the character string based on a music feature; and determining means 408 for determining, based on an evaluation result, at least one music segment corresponding to the at least one character string segment in the character string as a feature segment.

Figure 5:
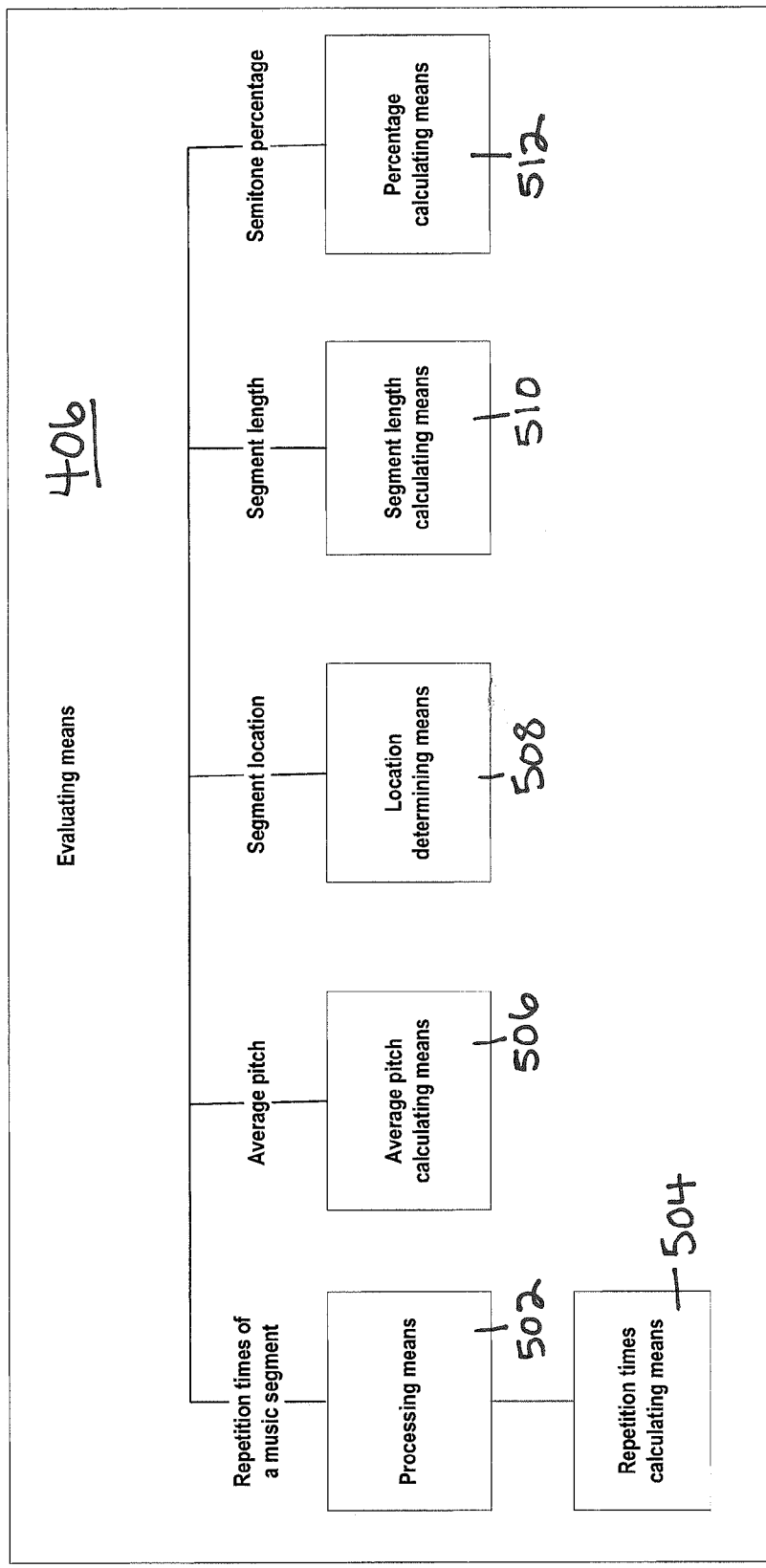
FIG. 5 illustrates a system block diagram of an evaluating apparatus according to one embodiment.

FIG. 5 illustrates a system block diagram of an evaluating means 406 according to one embodiment. If the music feature comprises repetition times of a music segment, then the evaluating means 406 further comprises processing means 502 and repetition times calculating means 504. The processing means 502 is for processing the character string to acquire a differential representation of the character string, and the repetition times calculating means 504 is for calculating repetition times of at least one character string segment in the differential representation. Acquiring a differential representation is to include tone modification repetition in evaluation factors when evaluating a character string segment. According to another embodiment, only simple segment repetition is considered, without considering the tone modification repetition, such that the evaluating means further comprises means for determining repetition times of at least one character string segment (not shown in the figure).

If the music feature comprises average pitch, then the evaluating means 406 further comprises average pitch calculating means 506. The average pitch calculating means 506 is for calculating the average pitch of a music segment corresponding to at least one character string segment in the character string.

If the music feature comprises segment location, then the evaluating means 406 further comprises location determining means 508. The location determining means 508 is for determining the location of at least one character string segment in the character string in the entire character string.

If the music feature comprises segment length, then the evaluating means 406 further comprises segment length calculating means 510. The segment length calculating means 510 is for calculating the segment length of at least one character string segment in the character string.

If the music feature comprises semitone percentage, then the evaluating means 406 further comprises semitone percentage calculating means 512. The semitone percentage calculating means 512 is for calculating the semitone percentage of a music segment corresponding to at least one character string segment in the character string.

According to one embodiment, the converting means 404 of FIG. 4 may further comprise standardization means (not shown in FIG. 4). The standardization means is for performing standard representation to any arbitrary one of tone or syllable length of the music file.

According to another embodiment, the evaluating means 406 in FIG. 4 may be further used for evaluating at least one character string segment that exceeds a predetermined length in the character string.

According to a further embodiment, the determining means of 408 FIG. 4 determines a feature segment by further using a classifier that is trained with training data, wherein the training data comprise a given music file and its feature segment.

According to a still a further embodiment, the determining means 408 of FIG. 4 further determines a feature segment based on a result of comparing evaluation results of different character string segments in the character string.

According to a yet a further embodiment, the determining means 408 of FIG. 4 further uses a combination of a plurality of music segments corresponding to at least one character string segment in the character string as a feature segment.

Other specific details (including functions and instances, etc.) implemented by various system means in the present invention correspond to corresponding steps in the process flow, thus the repetitive content will not be detailed here.

Those skilled in the art will appreciate that the present disclosure may be embodied as an apparatus, a method, or a computer program product. Thus, the present disclosure may be specifically implemented by complete hardware, complete software (including firmware, resident software, microcode, etc.), or a combination of software and hardware as generally called "circuit," "module," or "system" in this text. Further, the present disclosure may adopt a form of computer program product as embodied in any tangible medium of expression, the medium comprising computer-usable program code.

Any combination of one or more computer-usable or computer-readable mediums may be used. The computer-usable or computer-readable medium may be for example, but not limited to, electrical, magnetic, optical, electromagnetic, infrared, or semiconductor system, means, device, or propagation medium. More specific examples (non-exhaustive list) of the computer-readable medium comprise the following: an electric connection having one or more leads, a portable computer magnetic disk, hard disk, random access memory (RAM), read-only memory (ROM), erasable programmable read-only memory (EPROM or flash disk), optical fiber, portable compact disk read-only memory (CD-ROM), optical storage device, a transmission medium for example supporting Internet or intranet, or a magnetic storage device. It should be noted that the computer-usable or computer readable medium may even be a paper or other suitable medium printed with a program thereon, because the program may be acquired electronically by electrically scanning such paper or other medium, and then compiled, interpreted or processed in a suitable manner, and if necessary, stored in a computer memory. In the context of the present document, a computer-usable or computer-readable medium may be any medium containing, storing, communicating, propagating, or transmitting a program usable for an instruction execution system, apparatus or device, or associated with the instruction execution system, apparatus, or device. A computer-usable medium may comprise a data signal contained in a base band or propagated as a part of carrier and embodying a computer-usable program code. A computer-usable program code may be transmitted by any suitable medium, including, but not limited to, radio, wire, cable, or RF, etc.

A computer program code for executing operation of the present invention may be complied by any combination of one or more program design languages, the program design languages including object-oriented program design languages, such as Java, Smalltalk, C++, etc., as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the latter circumstance, the remote computer may be connected to the user computer through various kinds of networks, including local area network (LAN) or wide area network (WAN), or connected to external computer (for example, using an internet service provider via Internet).

It should be understood that each block in the flow charts and/or block diagrams and combination of each block in the flow charts and/or block diagrams of the present embodiments may be implemented by computer program instructions. These computer program instructions may be provided to a processor of a utility computer, a dedicated computer or other programmable data processing apparatus, thereby generating a machine such that these instructions executed through the computer or other programmable data processing apparatus generate means for implementing functions/operations prescribed in the blocks of the flow charts and/or block diagrams.

These computer program instructions may also be stored in a computer-readable medium capable of instructing the computer or other programmable data processing apparatus to work in a particular manner, such that the instructions stored in the computer-readable medium generate a product including instruction means for implementing the functions/operations prescribed in the flow charts and/or block diagrams.

The computer program instructions may also be loaded on a computer or other programmable data processing apparatus, such that a series of operation steps are implemented on the computer or other programmable data processing apparatus, to generate a computer-implemented process, such that execution of the instructions on the computer or other programmable apparatus provides a process of implementing the functions/operations prescribed in the blocks of the flow charts and/or block diagrams.

The flow charts and block diagrams in the figures illustrate the system, methods, as well as architectures, functions and operations that may be implemented by a computer program product according to the embodiments of the present invention. In this regard, each block in the flowcharts or block diagrams may represent a module, a program segment, or a part of code, which contains one or more executable instructions for implementing specified logic functions. It should also be noted that in some alternative implementations, functions indicated in blocks may occur in an order differing from the order as shown in the figures. For example, two blocks shown consecutively may be performed in parallel substantially or in an inverse order. This depends on relevant functions. It should also be noted that each block in the block diagrams and/or flowcharts and a combination of blocks in the block diagrams and/or flowcharts may be implemented by a dedicated hardware-based system for performing specified functions or operations or by a combination of dedicated hardware and computer instructions.

The terms as used herein are only for describing specific embodiments, but not intended to limit the present invention. The phrase "a" and "the" in singular form herein is intended also to include a plural form, unless otherwise specified in the context. It should be further noted that when the word "comprising" is used in this specification, it indicates existence of a feature, unity, step, operation, unit and/or component as set forth, but it does not exclude existent or addition of one or more other features, unities, steps, operations, units and/or components, and/or their combination.

The corresponding structure, material, operation, and all equivalent replacements of functionally limited means or steps in the claims are intended to comprise any structure, material or operation for performing the function in combination with other units as specifically set forth in the claims. The provided description on the present invention is intended to illustration and depiction, which is not for exhaustion, or limiting the present invention to the expressed manner. To a person of normal skill in the art, many modifications and variations may be apparently allowed without departing from the scope and spirit of the present invention. Selection and illustration of the embodiments are for better explaining the principle and actual application of the present invention such that a person of normal skill in the art may understand that the present invention may have various embodiments with various kinds of changes suitable for the required specific use.

The invention claimed is:

1. A method of automatically acquiring a feature segment in a music file, comprising:
   receiving, with a processing device, a music file;
   converting the music file into a character string;
   evaluating at least one character string segment in the character string based on one or more music features comprising repetition times of a music segment, the evaluating comprising processing the character string to acquire a differential representation of the character string, and calculating repetition times of at least one character string segment in the differential representation; and
   determining, based on an evaluation result, at least one music segment corresponding to at least one character string segment in the character string as a feature segment.

2. The method according to claim 1, wherein the converting further comprises:
   performing standard representation on the character string according to at least one of tone or syllable length.

3. The method according to claim 1, wherein the evaluating further comprises:
   evaluating at least one character string segment that exceeds a predetermined length in the character string.

4. The method according to claim 1, wherein the music feature comprises an average pitch, and evaluating at least one character string segment in the character string based on one or more music features further comprises:
   calculating an average pitch of a music segment corresponding to at least one character string segment in the character string.

5. The method according to claim 1, wherein the music feature comprises segment location, and evaluating at least one character string segment in the character string based on one or more music features further comprises:
   determining a location of at least one character string segment in the character string in the entire character string.

6. The method according to claim 1, wherein the music feature comprises a segment length, and the evaluating at least one character string segment in the character string based on one or more music features further comprises:
   calculating a segment length of at least one character string segment in the character string.

7. The method according to claim 1, wherein the music feature comprises a semitone percentage, and evaluating at least one character string segment in the character string based on one or more music features further comprises:
   calculating a semitone percentage of a music segment corresponding to at least one character string segment in the character string.

8. The method according to claim 1, wherein determining at least one music segment as a feature segment further comprises:
   determining a feature segment by using a classifier that has been trained with training data, wherein the training data comprise a given music file and its feature segment.

9. The method according to claim 1, wherein determining at least one music segment as a feature segment further comprises:
   determining a feature segment based on a result of comparing evaluation results of different character string segments in the character string.

10. The method according to claim 1, wherein determining at least one music segment as a feature segment further comprises:
    using a combination of a plurality of music segments corresponding to at least one character string segment in the character string as a feature segment.

11. A system for automatically acquiring a feature segment in a music file, comprising:
    receiving means, configured to receive a music file;
    converting means, configured to convert the music file into a character string;
    evaluating means, configured to evaluate at least one character string segment in the character string based on one or more music features, comprising repetition times of a music segment, the evaluating means configured to process the character string to acquire a differential representation of the character string, and calculate repetition times of at least one character string segment in the differential representation; and
    determining means, configured to determine, based on an evaluation result, at least one music segment corresponding to at least one character string segment in the character string as a feature segment.

12. The system according to claim 11, wherein the converting means further comprises:
    standardization means, configured to perform standard representation on the character string according to at least one of tone or syllable length.

13. The system according to claim 11, wherein the evaluating means is further configured to evaluate at least one character string segment that exceeds a predetermined length in the character string.

14. The system according to claim 11, wherein the music feature comprises an average pitch, and the evaluating means further comprises:
 average pitch calculating means, configured to calculate an average pitch of a music segment corresponding to at least one character string segment in the character string.

15. The system according to claim 11, wherein the music feature comprises segment location, and the evaluating means further comprises:
 location determining means, configured to determine a location of at least one character string segment in the character string in the entire character string.

16. The system according to claim 11, wherein the music feature comprises a segment length, and the evaluating means further comprises:
 segment length calculating means, configured to calculate a segment length of at least one character string segment in the character string.

17. The system according to claim 11, wherein the music feature comprises a semitone percentage, and the evaluating means further comprises:
 percentage calculating means, configured to calculate a semitone percentage of a music segment corresponding to at least one character string segment in the character string.

18. The system according to claim 11, wherein the determining means is further configured to determine a feature segment by using a classifier that has been trained with training data, wherein the training data comprises a music file and a specified feature segment.

19. The system according to claim 11, wherein the determining means is further configured to determine a feature segment based on a result of comparing evaluation results of different character string segments in the character string.

20. The system according to claim 11, wherein the determining means is further configured to use a combination of a plurality of music segments corresponding to at least one character string segment in the character string as a feature segment.

* * * * *